US009146671B2

(12) United States Patent
Ishibashi (10) Patent No.: US 9,146,671 B2
(45) Date of Patent: Sep. 29, 2015

(54) IMAGE DISPLAY DEVICE, IMAGE CONTROL DEVICE, IMAGE FORMING DEVICE, IMAGE CONTROL METHOD, AND STORAGE MEDIUM

(71) Applicant: FUJI XEROX CO., LTD., Minato-ku, Tokyo (JP)

(72) Inventor: Yuko Ishibashi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 340 days.

(21) Appl. No.: 13/661,797

(22) Filed: Oct. 26, 2012

(65) Prior Publication Data

US 2013/0335341 A1    Dec. 19, 2013

(30) Foreign Application Priority Data

Jun. 13, 2012 (JP) .................................. 2012-133506

(51) Int. Cl.
*G06F 3/041* (2006.01)
*G06F 3/0488* (2013.01)

(52) U.S. Cl.
CPC .................................. *G06F 3/04883* (2013.01)

(58) Field of Classification Search
CPC ........................... G06F 3/0483; H04N 1/00458
USPC .......................................... 345/684; 715/785
See application file for complete search history.

(56) References Cited

U.S. PATENT DOCUMENTS

| | | | |
|---|---|---|---|
| 6,462,752 B1* | 10/2002 | Ma et al. ........................ | 345/684 |
| 6,509,907 B1* | 1/2003 | Kuwabara ..................... | 345/684 |
| 6,865,718 B2* | 3/2005 | Levi Montalcini ........... | 715/786 |
| 7,173,637 B1* | 2/2007 | Hinckley et al. .............. | 345/684 |
| 7,184,064 B2* | 2/2007 | Zimmerman et al. ........ | 345/684 |
| 8,082,522 B2* | 12/2011 | Kinouchi ...................... | 715/830 |
| 2003/0076301 A1* | 4/2003 | Tsuk et al. ..................... | 345/159 |
| 2003/0098885 A1* | 5/2003 | Yabe .............................. | 345/785 |
| 2007/0146337 A1* | 6/2007 | Ording et al. ................. | 345/173 |
| 2009/0070711 A1* | 3/2009 | Kwak et al. ................... | 715/829 |
| 2010/0134425 A1* | 6/2010 | Storrusten .................... | 345/173 |
| 2010/0235794 A1* | 9/2010 | Ording .......................... | 715/863 |

(Continued)

FOREIGN PATENT DOCUMENTS

| | | | |
|---|---|---|---|
| JP | 2009020733 A | * | 1/2009 |
| JP | 2011-257871 A | | 12/2011 |

OTHER PUBLICATIONS

Machine translation of JP-2009020733A downloaded Mar. 25, 2015, 1-19 pages.*

*Primary Examiner* — Dorothy Harris
(74) *Attorney, Agent, or Firm* — Sughrue Mion, PLLC (57) ABSTRACT

An image display device includes: a display that displays an image which represents a first part of information content and that switches the image to represent a second part of the information content; a detection section that detects a contacting object which contacts the display; an image switch determination section that determines whether or not to switch the image displayed on the display in accordance with operation of the contacting object detected by the detection section; a speed storage section that stores a speed at which the image is switched in the case where the image switch determination section determines to switch the image; and an image display controller that controls the display to continuously switch the image to represent subsequent part of the information content at the speed stored in the speed storage section when the image is continuously switched a predetermined number of times or more.

2 Claims, 12 Drawing Sheets

(56) References Cited

U.S. PATENT DOCUMENTS

| | | | |
|---|---|---|---|
| 2010/0277496 A1* | 11/2010 | Kawanishi et al. | 345/589 |
| 2010/0321411 A1* | 12/2010 | Paek et al. | 345/684 |
| 2011/0061025 A1* | 3/2011 | Walline et al. | 715/830 |
| 2011/0234515 A1* | 9/2011 | Kamijima | 345/173 |
| 2011/0302490 A1 | 12/2011 | Koarai | |
| 2012/0098769 A1* | 4/2012 | Nagasaka | 345/173 |
| 2012/0162267 A1* | 6/2012 | Shimazu | 345/684 |
| 2012/0313977 A1* | 12/2012 | Kwon | 345/684 |

\* cited by examiner

IMAGE DISPLAY DEVICE, IMAGE CONTROL DEVICE, IMAGE FORMING DEVICE, IMAGE CONTROL METHOD, AND STORAGE MEDIUM

CROSS-REFERENCE TO RELATED APPLICATIONS

This application is based on and claims priority under 35 USC 119 from Japanese Patent Application No. 2012-133506 filed Jun. 13, 2012.

BACKGROUND

Technical Field

The present invention relates to an image display device, an image control device, an image forming device, an image control method, and a storage medium.

SUMMARY

According to an aspect of the present invention, there is provided an image display device including: a display that displays an image which represents a first part of information content and that switches the image to represent a second part of the information content; a detection section that detects a contacting object which contacts the display; an image switch determination section that determines whether or not to switch the image displayed on the display in accordance with operation of the contacting object detected by the detection section; a speed storage section that stores a speed at which the image is switched in the case where the image switch determination section determines to switch the image; and an image display controller that controls the display to continuously switch the image to represent subsequent part of the information content at the speed stored in the speed storage section when the image is continuously switched a predetermined number of times or more.

BRIEF DESCRIPTION OF THE DRAWINGS

Exemplary embodiments of the present invention will be described in detail based on the following figures, wherein.

DETAILED DESCRIPTION

First Exemplary Embodiment

Exemplary embodiments of the present invention will be described in detail below with reference to the accompanying drawings. First, the configuration and the operation of a first exemplary embodiment will be described in detail.

Figure 1:
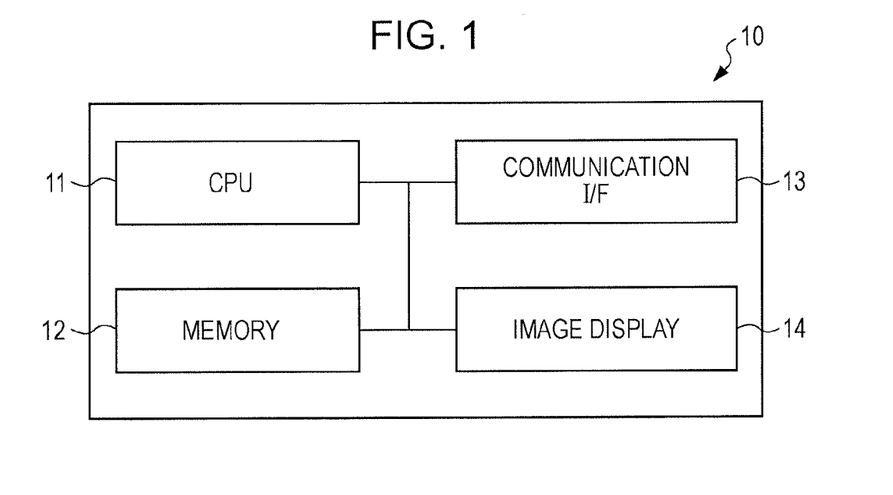
FIG. 1 shows the hardware configuration of an image display device according to an exemplary embodiment.

FIG. 1 shows the hardware configuration of an image display device according to an exemplary embodiment.

An image display device 10 according to the exemplary embodiment is a computer device such as a smartphone, a tablet, a cellular phone, or a personal computer (PC), for example.

As shown in FIG. 1, the image display device 10 includes a central processing unit (CPU) 11, and a memory 12 serving as a storage unit. The CPU 11 executes various types of software such as an operating system (OS) and applications. The memory 12 is a storage region in which the various types of software, data for execution of such software, etc., are stored. The image display device 10 further includes a communication interface 13 (hereinafter referred to as "communication I/F") for external communication, and an image display 14 that displays an image. The image display device 10 may include a hard disk drive (HDD) or a flash memory serving as a storage unit. The HDD or the flash memory stores data input to the various types of software, data output from the various types of software, etc. The image display device 10 may further include an input device such as a keyboard or a mouse. The CPU 11 and the memory 12 may be considered as a controller that decides an image to be displayed on the image display 14 and that controls display of the decided image.

Figure 2:
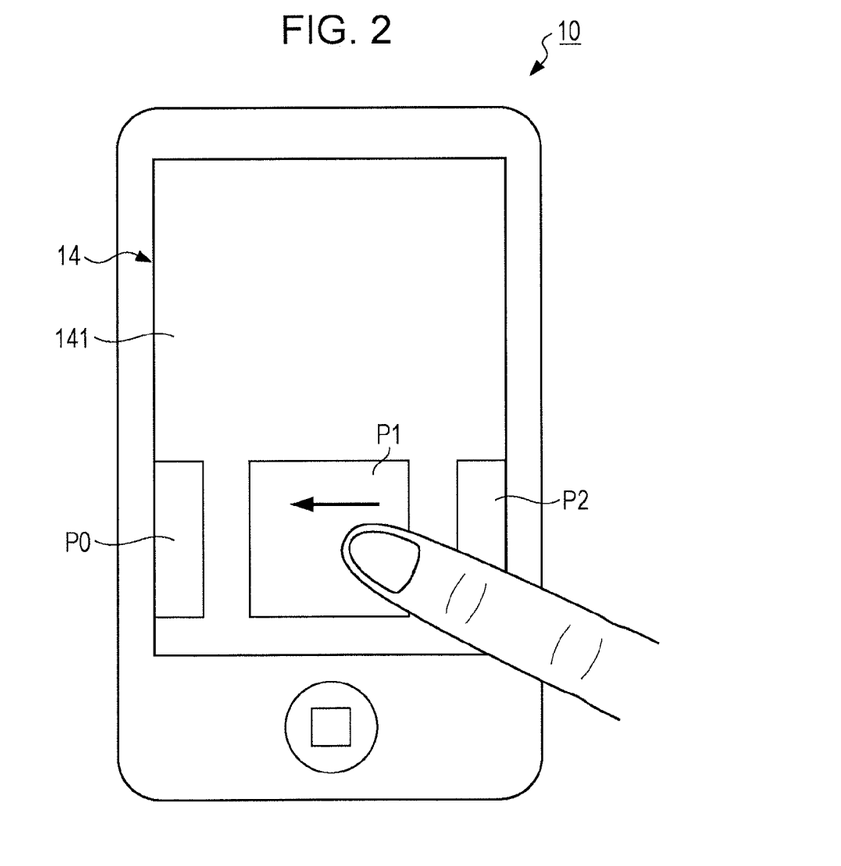
FIG. 2 illustrates an image display.

FIG. 2 illustrates the image display 14.

The image display device 10 is illustrated as a so-called smartphone. A touch panel is adopted as the image display 14. Therefore, the image display 14 includes a liquid crystal panel 141 serving as an example of a display, and a position detection section (not shown) that detects the position at which a contacting object contacts the liquid crystal panel 141 when the contacting object contacts the liquid crystal panel 141. The contacting object is typically a user's finger or a stylus pen. In the exemplary embodiment, the touch panel for use as the liquid crystal panel 141 is not specifically limited, and may be of a variety of types such as a resistance-film type and an electrostatic capacitance type.

In the thus configured image display device 10, content (information content) may be displayed as an image in a predetermined region of the liquid crystal panel 141. In the case where the content extends over plural pages (plural sheets), in general, each page is displayed on the liquid crystal panel 141, and the user views the image while switching images from page to page. That is, in the liquid crystal panel 141, a part of the content is displayed as an image for each page in the predetermined region, and the image is switched so as to display the part of the content in a predetermined order. This corresponds to a case where the content is electronic book data and the user views the content while switching images from page to page, for example.

In the image display device 10 such as a smartphone shown in FIG. 2, switching between images is performed by performing a flicking operation in a predetermined direction with a contacting object, such as a finger or a stylus pen, being kept in contact with the liquid crystal panel 141. That is, the image displayed on the liquid crystal panel 141 is switched to another image when the user flicks the contacting object at a location at which the image is displayed on the liquid crystal panel 141.

In FIG. 2, a user's finger is shown as the contacting object, and an image P1 is shown as the image currently being displayed. In this case, when the image P1 displayed around the center of the liquid crystal panel 141 is flicked leftward as shown in FIG. 2, an image P2 for the next page is moved to the center of the liquid crystal panel 141 to be displayed in place of the image P1. Conversely, when the image P1 being displayed is flicked rightward, an image P0 for the previous page is moved to the center of the liquid crystal panel 141 to be displayed in place of the image P1. The user may continuously view images by continuously performing flick operations to successively switch images. Viewing the content through such flick operations allows handling electronic data as if handling paper data, improving convenience for the user.

If there are a large number of pages, however, it is necessary to repeat flick operations over and over while viewing the content on the liquid crystal panel 141, which may be bothersome for the user. This may further increase the physical burden on the user.

A slide show function is generally known as a method to allow viewing content including image data such as photographs. When the slide show function is used, preview images of the photographs are displayed on the liquid crystal panel 141. The user performs an operation to start a slide show of the preview images being displayed. This causes switching between the preview images displayed on the liquid crystal panel 141, allowing the user to successively view the photographs. If the switching speed is constant and not changed, however, preview images for which check is scarcely required may take considerable time. In the case where a larger number of photographs are to be viewed, in addition, the viewer may be at a loss because he/she does not know where the photograph being viewed is in the entire content, which may be inconvenient.

In the exemplary embodiment which is intended to address the foregoing issue, when the user continuously performs a predetermined number of flick operations or more, switching between subsequent pages is performed automatically as described below.

Figure 3:
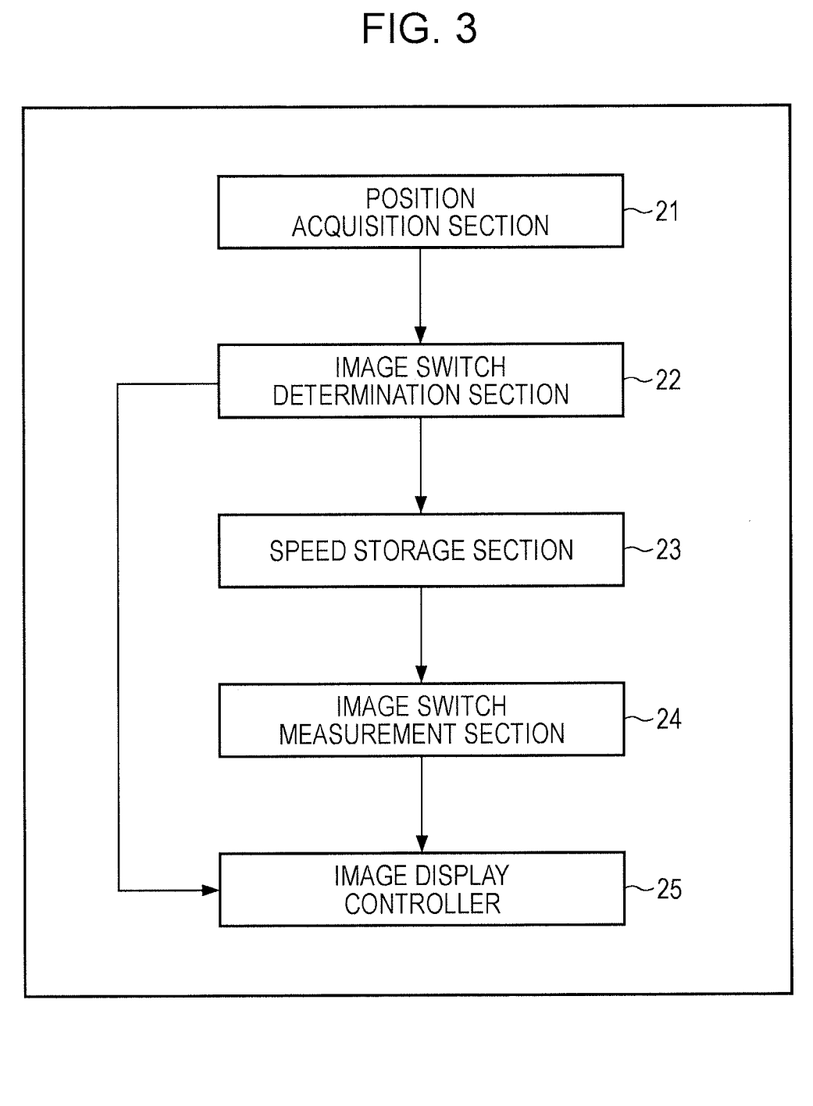
FIG. 3 shows a first functional configuration example of a controller according to an exemplary embodiment.

FIG. 3 shows a first functional configuration example of a controller according to the exemplary embodiment.

As shown in FIG. 3, the controller according to the exemplary embodiment includes a position acquisition section 21, an image switch determination section 22, a speed storage section 23, an image switch measurement section 24, and an image display controller 25.

The position acquisition section 21 acquires the position at which a contacting object such as a user's finger contacts the liquid crystal panel 141 (see FIG. 2) when the contacting object contacts the liquid crystal panel 141. That is, as discussed above, the image display 14 is a touch panel, and includes a position detection section that detects the position at which the contacting object contacts the liquid crystal panel 141. Therefore, the position acquisition section 21 may acquire the position at which the contacting object contacts the liquid crystal panel 141 from the position detection section.

The image switch determination section 22 determines whether or not to switch the image displayed on the liquid crystal panel 141 in accordance with variations in position acquired by the position acquisition section 21 (which may also be referred to as "position detected by the position detection section"). That is, the image switch determination section 22 determines whether or not an operation performed on the liquid crystal panel 141 by the contacting object is a flick operation. In the case where the user performs a flick operation, the image switch determination section 22 determines the direction in which the position at which the contacting object contacts the liquid crystal panel 141 is moved, and determines whether the image is switched to an image for the previous page or an image for the next page.

The speed storage section 23 stores the image switching speed in the case where the image switch determination section 22 determines to switch the currently displayed image to another image.

The image switch measurement section 24 counts the number of times switching between images is performed by performing flick operations by the user. The image switch measurement section 24 counts the number of flick operations performed continuously. In the case where a different operation is performed in between the flick operations, the number of flick operations counted is reset to "0".

The image display controller 25 acquires from the image switch measurement section 24 the number of flick operations continuously performed by the user. When flick operations are performed continuously a predetermined number of times or more, that is, the image is continuously switched a predetermined number of times or more, switching between subsequent images is continuously performed on the basis of the speed stored in the speed storage section 23. That is, in the case where the user continuously performs a predetermined number of flick operations or more, the image displayed on the liquid crystal panel 141 is automatically switched. The image display controller 25 switches images at the speed stored in the speed storage section 23.

Figure 4:
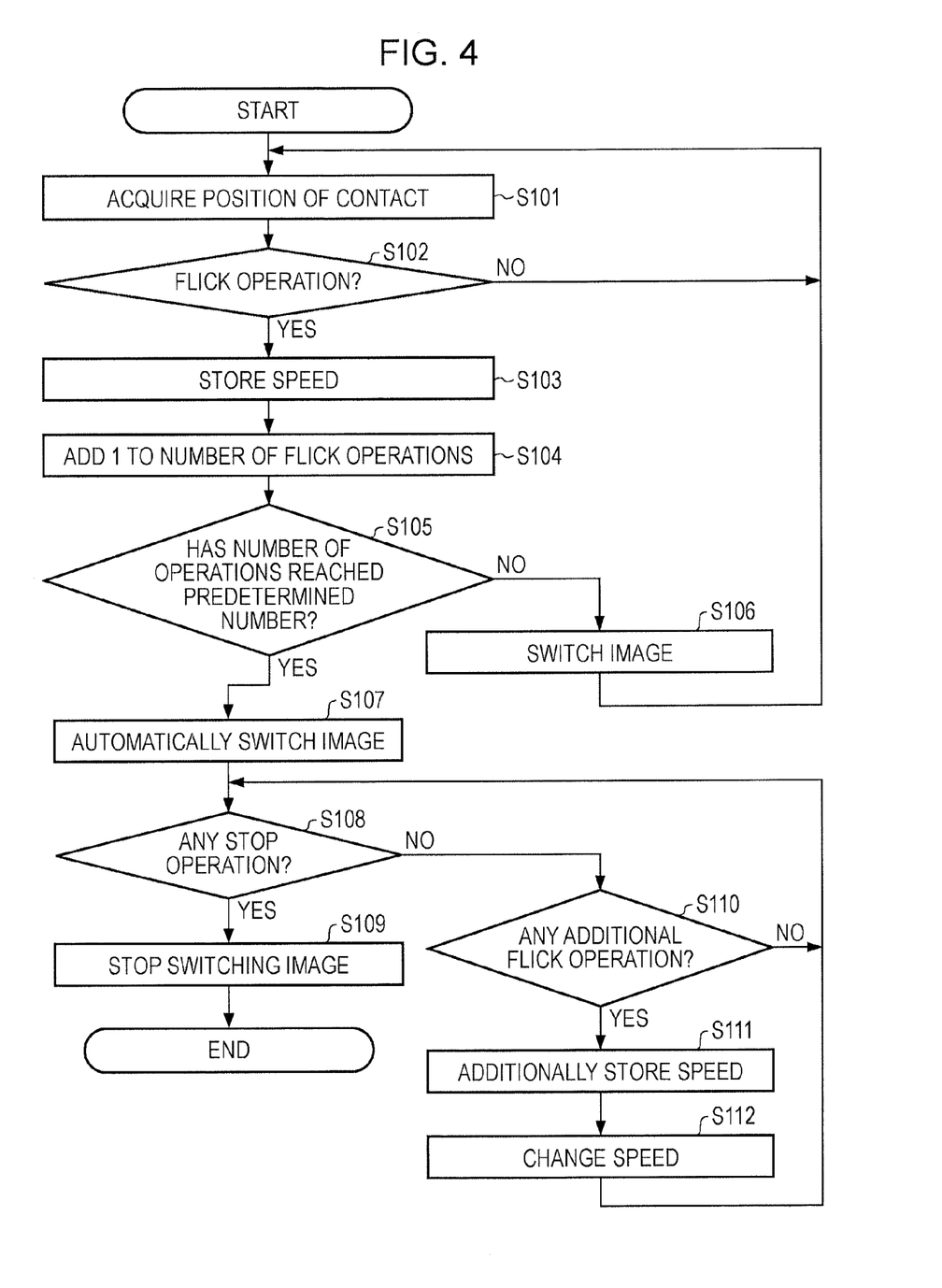
FIG. 4 is a flowchart illustrating operation of the controller shown in FIG. 3.

FIG. 4 is a flowchart illustrating operation of the controller shown in FIG. 3.

Operation of the controller according to the exemplary embodiment will be described below with reference to FIGS. 3 and 4. As a precondition for performing the following process, an image that may be switched by performing a leftward or rightward flick operation is displayed in advance on the liquid crystal panel 141.

First, when the contacting object, such as a user's finger, contacts the liquid crystal panel 141 of the image display 14, the position detection section of the image display 14 detects the position of contact. The position acquisition section 21 of the controller acquires the position of contact from the position detection section (step 101).

Next, the image switch determination section 22 determines whether or not an operation performed by the contacting object at a location on the liquid crystal panel 141 at which the image described above is displayed is a flick operation (step 102). In the case where the image switch determination section 22 determines that a flick operation is performed (Yes in step 102), it is determined in the exemplary embodiment that the operation is an operation performed by the user to switch images. It is determined whether the user desires to switch the image to an image for the previous page or an image for the next page in accordance with whether a leftward flick operation or a rightward flick operation is performed. That is, in the case where a leftward flick operation is performed, it is determined that the user desires to switch the image to an image for the next page. In the case where a rightward flick operation is performed, on the other hand, it is determined that the user desires to switch the image to an image for the previous page. In the case where the image switch determination section 22 determines that a flick operation is not performed (No in step 102), the process returns to step 101.

Next, the speed storage section 23 stores the speed at which the flick operation is performed (step 103). Specifically, when the user performs the flick operation, the position of contact acquired by the position acquisition section 21 is moved. The speed at which the flick operation is performed may be calculated, for example, based on how much distance the contacting object is moved over a predetermined time period.

Next, the image switch measurement section 24 adds "1" to the number of flick operations performed by the user (step 104). The initial value of the number of flick operations counted by the image switch measurement section 24 is "0". The image switch measurement section 24 counts number of flick operations performed continuously. Therefore, in the case where a different operation is performed in between the flick operations, the number of flick operations counted is reset to the initial value "0".

The image switch measurement section 24 determines whether or not the number of flick operations counted has reached a predetermined value (step 105).

In the case where the number of flick operations counted has not reached the predetermined value (No in step 105), the image display controller 25 switches the image displayed on the liquid crystal panel 141 to an image for the next page or an image for the previous page in accordance with the results of the determination performed by the image switch determination section 22 (step 106). After that, the process returns to step 101.

In the case where the number of flick operations counted has reached the predetermined value (Yes in step 105), on the other hand, the image display controller 25 automatically switches subsequent images (step 107). The switching speed used at this time is decided on the basis of the speed stored in the speed storage section 23.

If settings are made to automatically switch images when the number of flick operations counted has reached three, for example, the first three switches between images are performed by the user by performing flick operations. That is, images are switched manually. The fourth and subsequent switches between images are automatically performed by the image display controller 25 on the basis of the speed stored in the speed storage section 23.

In the exemplary embodiment, for example, switches between images are performed according to the settings described above as follows:

(First image switch (manual))
→(Second image switch (manual))
→(Third image switch (manual))
→(Fourth image switch (automatic, at the same switching speed as the speed of the first image switch))
→(Fifth image switch (automatic, at the same switching speed as the speed of the second image switch))
→(Sixth image switch (automatic, at the same switching speed as the speed of the third image switch))
→ . . . (Thereafter, the fourth to sixth image switches are repeated.)

When the image display controller 25 operates to automatically switch images, the image switch determination section 22 determines whether or not the user has performed a predetermined operation to stop operation of switching between images (step 108). The stop operation may be an operation to tap at a location at which an image is to be displayed, for example.

In the case where the image switch determination section 22 determines that a stop operation has been performed (Yes in step 108), the image display controller 25 stops operation to switch images (step 109). This allows the user, for example, to check the content at the location of the stop. In addition, displaying the image as enlarged at the location of the stop may make it further easier for the user to check the content.

In the case where the image switch determination section 22 determines that a stop operation has not been performed (No in step 108), the image switch determination section 22 further determines whether or not the user has performed an additional flick operation (step 110).

In the case where the user has performed an additional flick operation (Yes in step 110), it is determined in the exemplary embodiment that the user has performed the operation for the purpose of changing the image switching speed. The speed storage section 23 additionally stores the speed at which the additional flick operation is performed (step 111). The image display controller 25 switches subsequent images at the speed stored in the speed storage section 23 (step 112). In other words, in the case where the image switch determination section 22 determines to further switch the image displayed on the liquid crystal panel 141 when the image display controller 25 is continuously switching the image, the speed storage section 23 additionally stores the image switching speed, and the image display controller 25 switches subsequent images at the speed additionally stored in the speed storage section 23. After that, the process returns to step 108. In the case where the user has not performed an additional flick operation (No in step 110), the process also returns to step 108.

Figure 5:
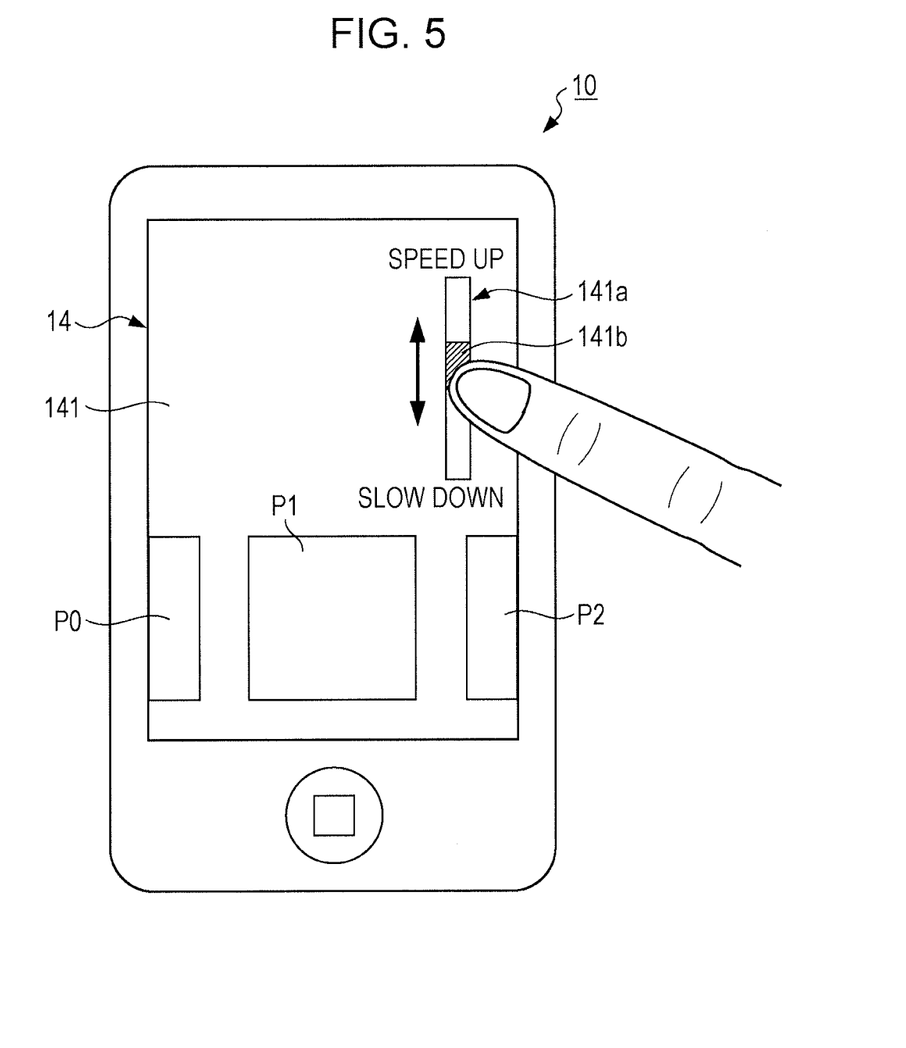
FIG. 5 shows a liquid crystal panel on which a speedometer is displayed.

In the example discussed above, the user performs an additional flick operation to change the image switching speed when the image display controller 25 operates to automatically switch images. However, the exemplary embodiment is not limited thereto. For example, a speedometer 141a may be displayed on the liquid crystal panel 141 as shown in FIG. 5, and a button 141b provided in the speedometer 141a to indicate the switching speed may be operated to change the image switching speed.

In the example discussed above, a flick operation is used as an example of an operation performed by the user to switch the image displayed on the liquid crystal panel 141. However, the exemplary embodiment is not limited thereto. A different operation such as a drag operation may also be used.

Second Exemplary Embodiment

Figure 6:
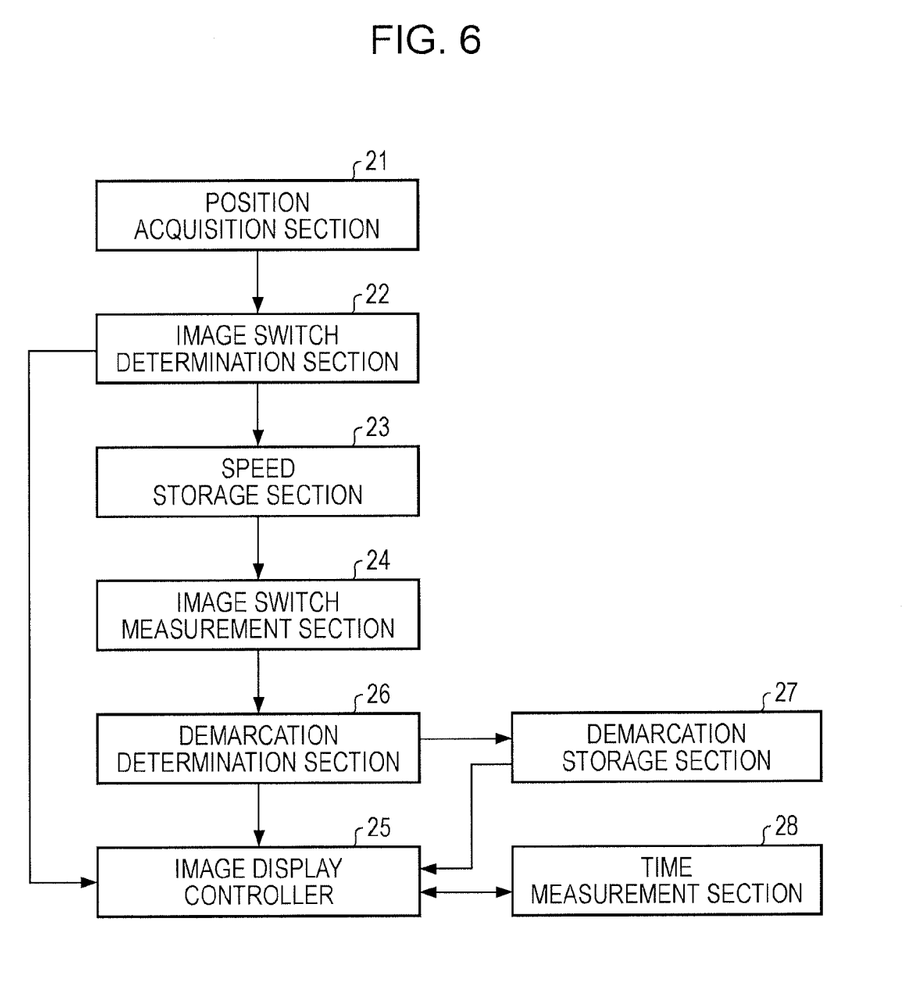
FIG. 6 shows a second functional configuration example of a controller according to an exemplary embodiment.

FIG. 6 shows a second functional configuration example of a controller according to an exemplary embodiment.

As shown in FIG. 6, the controller according to the exemplary embodiment includes a position acquisition section 21, an image switch determination section 22, a speed storage section 23, an image switch measurement section 24, an image display controller 25, a demarcation determination section 26, a demarcation storage section 27, and a time measurement section 28.

The respective functions of the position acquisition section 21, the image switch determination section 22, the speed storage section 23, and the image switch measurement section 24 are the same as the functions of those in FIG. 3, and thus are not described here.

The demarcation determination section 26 determines a demarcation portion in the content in accordance with predetermined demarcation conditions.

In the case where the content to be displayed is a preview image of a document to be printed, for example, the demarcation conditions may be set in accordance with document size, color/monochrome mode, double-sided/single-sided printing, document direction (portrait/landscape), font, number of pages to be printed on a single page (number of pages for N-Up printing), destination tray for paper ejection, and document reading location (platen glass/auto document feeder (ADF)), and may be set to indicate a point of change between folders containing the data to be printed, for each predetermined page, to indicate a case where the recognition ratio of optical character recognition (OCR) is low, to indicate a case where the document is upside down, etc.

In the case where the content to be displayed is a preview image of a photograph, the demarcation conditions may be set in accordance with date and time of capture (month, week, and time), to indicate a point of change between folders containing the photograph data, to indicate a point of change between cameras used to capture the photograph, etc.

The image display controller 25 continuously switches subsequent images on the basis of the speed stored in the speed storage section 23 when the image is continuously switched a predetermined number of times or more as discussed above. In the second exemplary embodiment, further, information on the demarcation portion determined by the demarcation determination section 26 is additionally displayed on the liquid crystal panel 141. That is, in the case where the image to be displayed is a page matching the demarcation conditions determined by the demarcation determination section 26, the content of the demarcation conditions etc. is displayed on the liquid crystal panel 141. In the second exemplary embodiment, such information is displayed through a pop-up indication.

The demarcation storage section 27 stores information on the demarcation portion determined by the demarcation determination section 26. The information on the demarcation portion is stored as history information as discussed later in detail.

The time measurement section 28 measures the time since the pop-up indication is started as discussed later in detail. When a predetermined time elapses, the image display controller 25 hides the pop-up indication.

Figure 7:
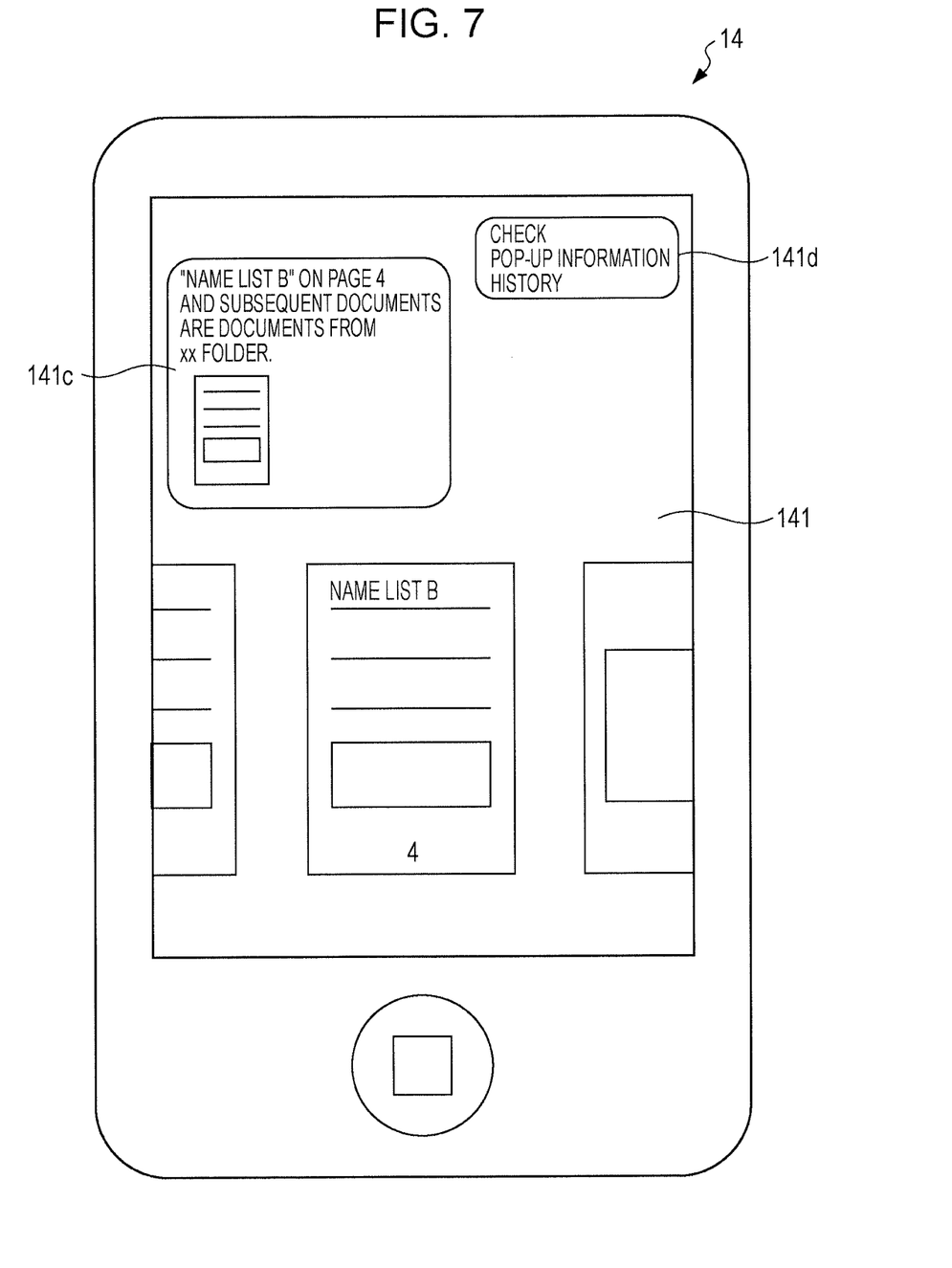
FIG. 7 shows a liquid crystal panel on which information on a demarcation portion is displayed through a pop-up indication.

FIG. 7 illustrates a case where information on a demarcation portion is displayed through a pop-up indication.

As shown in FIG. 7, a "name list B" document is currently displayed as page 4 on the liquid crystal panel 141. If the "name list B" document falls on a point of change between folders, such information is indicated by a pop-up 141c saying "'NAME LIST B' ON PAGE 4 AND SUBSEQUENT DOCUMENTS ARE DOCUMENTS FROM xx FOLDER". This may inform the user that page 4 being displayed corresponds to a demarcation portion and that the demarcation portion corresponds to a shift between folders, in addition to informing the user of the name of the folder. Display of the pop-up 141c allows the user to recognize that the corresponding portion needs attention for some reason.

When the user taps on the pop-up 141c, operation to automatically switch images is stopped, and an image for the page corresponding to the demarcation portion displayed through the pop-up 141c is displayed on the liquid crystal panel 141.

Figure 8:
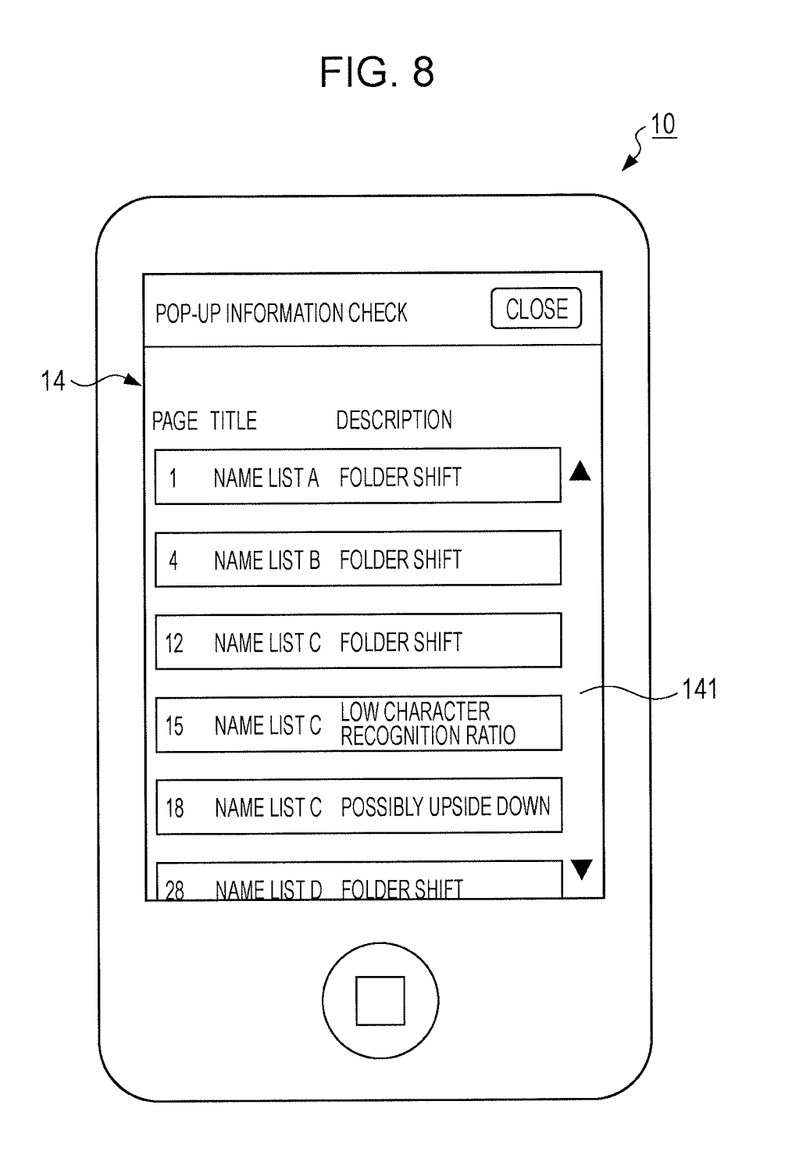
FIG. 8 shows a liquid crystal panel on which a history list is displayed.

The pop-up 141c is displayed for a predetermined time, and thereafter hidden. However, information displayed through a pop-up indication is stored to enable the user to check the information later as history information. In the example of FIG. 7, a history check button 141d is provided at the upper right of the liquid crystal panel 141. When the user taps on the history check button 141d, a history list such as that shown in FIG. 8 is displayed on the liquid crystal panel 141. In FIG. 8, the page number (indicated as "PAGE") of each demarcation portion, the title of each document, and information on each demarcation portion (indicated as "DESCRIPTION") are displayed in a list in the order of pages. In the case where there is any item that the user desires to check, he/she taps on the relevant item on the screen shown in FIG. 8. As a result, the image displayed on the liquid crystal panel 141 returns to the image shown in FIG. 7, and an image for the page corresponding to the selected demarcation portion is displayed on the liquid crystal panel 141.

In the second exemplary embodiment described above, an image for viewing the content and an image of the pop-up 141c are displayed separately. Therefore, the user can be informed of a demarcation portion in the content without reducing the image switching speed. Because a page corresponding to a demarcation portion may be viewed with switching between images stopped by tapping on the pop-up 141c, the user is allowed to take his/her time to check an item that he/she desires to check. When the user determines that it is not necessary to check the information, the pop-up indication may be ignored. Hence, the user may view the content without wasting time.

In the second exemplary embodiment, further, content stored in plural folders may be collectively displayed for a preview, for example. Such a configuration may be used to roughly check a large amount of information, for example. Further, the user may be informed of a page corresponding to a demarcation portion. This allows the user to find what part of the entire content he/she is currently viewing. Providing the history check button 141d etc. allows the user to find a demarcation portion in the content even while viewing the content, facilitating a search etc.

Figure 9:
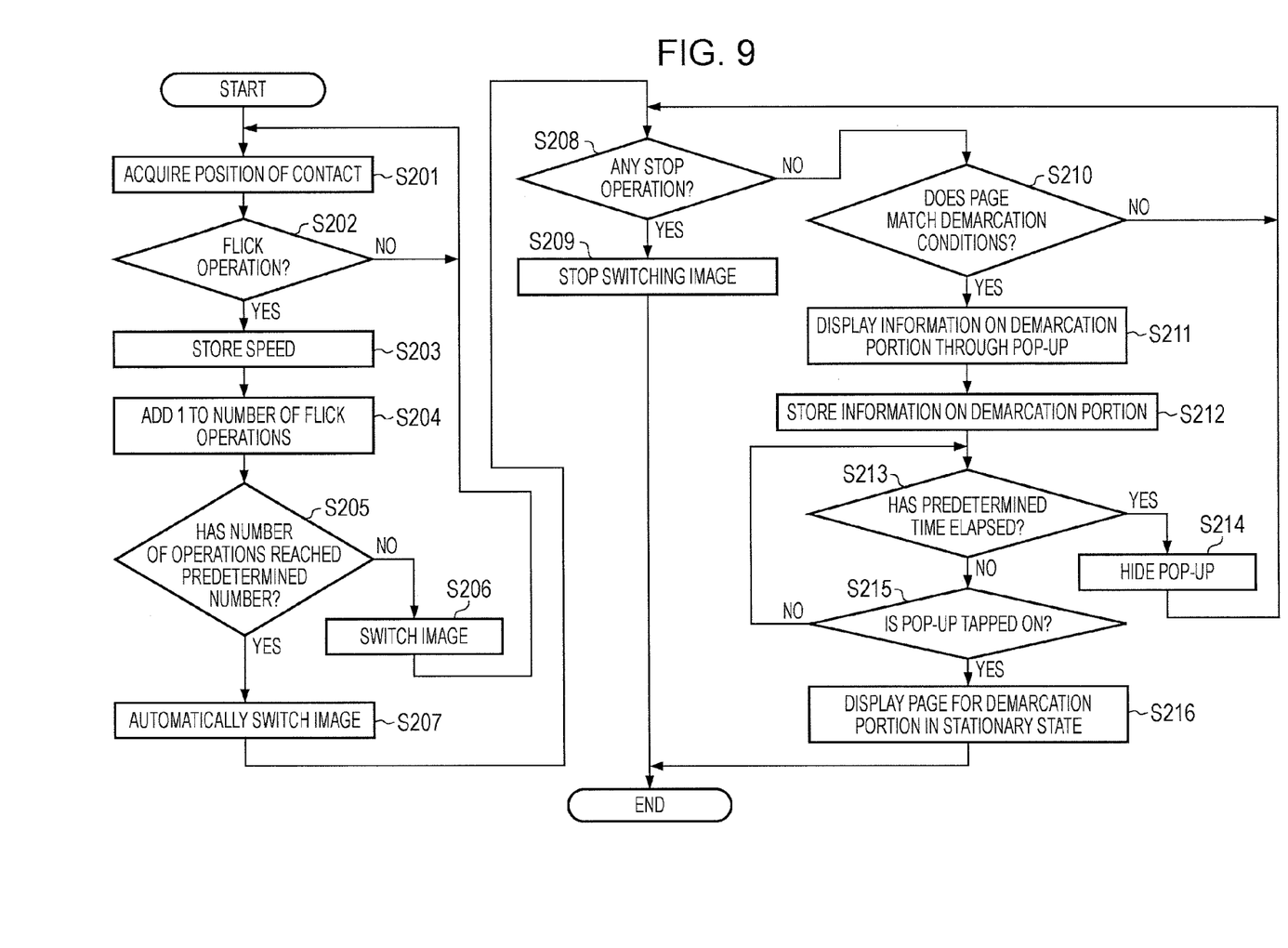
FIG. 9 is a flowchart illustrating operation of the controller shown in FIG. 6.

FIG. 9 is a flowchart illustrating operation of the controller shown in FIG. 6.

Operation of the controller according to the second exemplary embodiment will be described below with reference to FIGS. 6 and 9.

Step 201 to step 209 in FIG. 9 are the same as step 101 to step 109 in FIG. 4. Hence, subsequent operation of the controller will be described.

In the case where the image switch determination section 22 determines that a stop operation has not been performed (No in step 208), the demarcation determination section 26 determines whether or not a page displayed each time the image is switched matches predetermined demarcation conditions (step 210). When the page matches the demarcation conditions (Yes in step 210), information on a demarcation portion is displayed on the liquid crystal panel 141 by a predetermined method such as a pop-up indication (step 211). The demarcation storage section 27 stores information on the demarcation portion determined by the demarcation determination section 26 (step 212).

In the case where the page does not match the predetermined demarcation conditions (No in step 210), the process returns to step 208.

The time measurement section 28 measures the time since the pop-up indication is started to determine whether or not a predetermined time has elapsed (step 213). When a predetermined time has elapsed (Yes in step 213), the image display controller 25 hides the pop-up 141c (step 214). After that, the process returns to step 208.

When a predetermined time has not elapsed (No in step 213), it is determined whether or not the pop-up 141c has been tapped on (step 215). In the case where the pop-up 141c has been tapped on (Yes in step 215), the image display controller 25 has the page for the demarcation portion corresponding to the pop-up 141c displayed in a stationary state (step 216). In the case where the pop-up 141c has not been tapped on (No in step 215), the process returns to step 213.

Third Exemplary Embodiment

In the example discussed above, information on a demarcation portion is displayed on the liquid crystal panel 141 through the pop-up 141c. However, the exemplary embodiment is not limited thereto.

Figure 10:
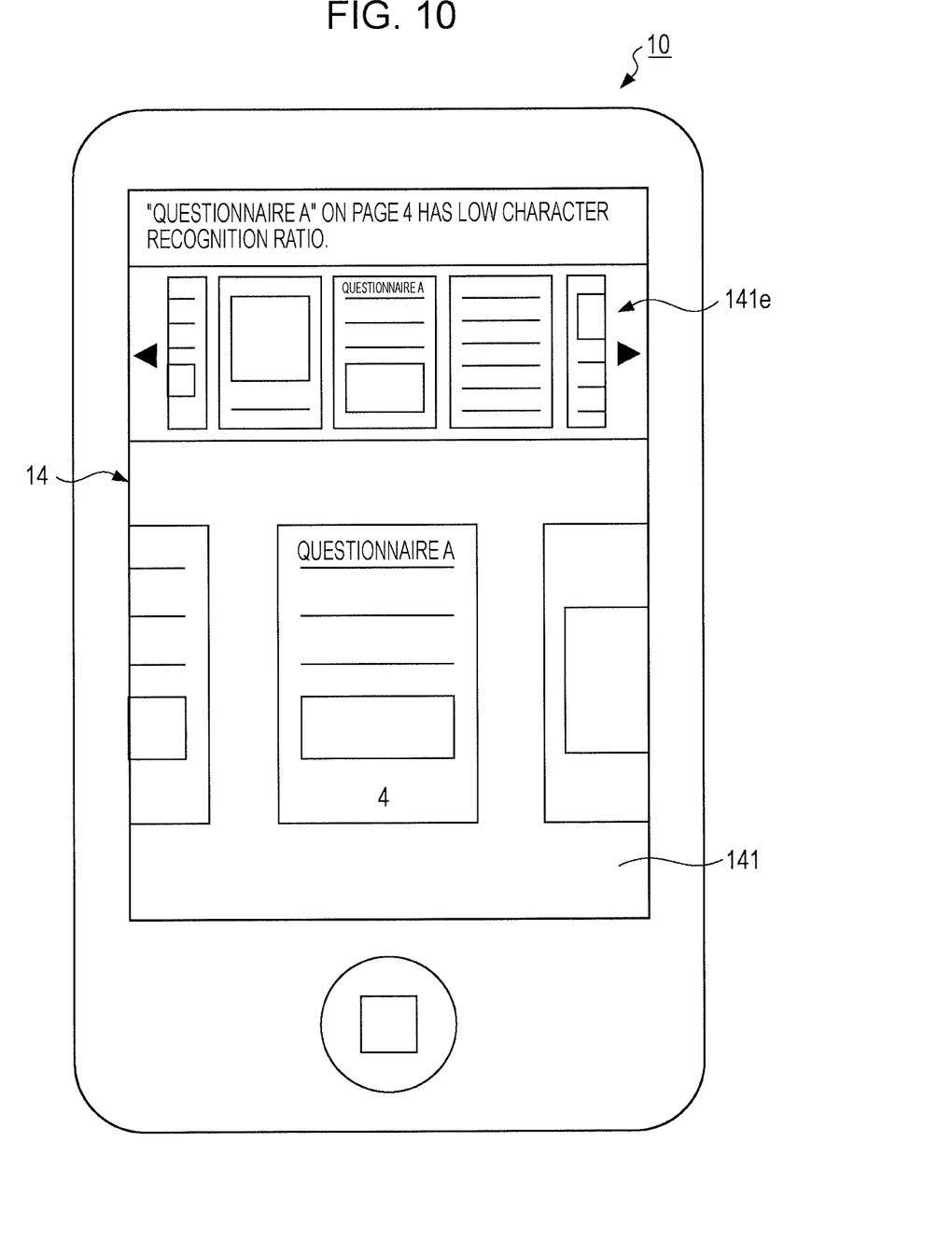
FIG. 10 illustrates another example in which information on a demarcation portion is displayed on the liquid crystal panel.

FIG. 10 illustrates another example in which information on a demarcation portion is displayed on the liquid crystal panel 141.

In the example shown in FIG. 10, images for the content corresponding to demarcation portions are displayed as a list in a region 141e that is different from a region in which images for content are displayed. The images for the content corresponding to the demarcation portions are displayed in the order of pages in a region above the region in which the images for the content are switchably displayed. In the example discussed above, the history list is not displayed on the liquid crystal panel 141 before the history check button 141d is tapped on. In this exemplary embodiment, however, the history list is displayed as an image in the region 141e, improving convenience for the user.

In the case where there is any item that the user desires to check among the images for the content corresponding to the demarcation portions displayed in the region 141e, the user taps on the corresponding image. As a result, an image for the page corresponding to the selected demarcation portion is displayed on the liquid crystal panel 141.

Figure 11:
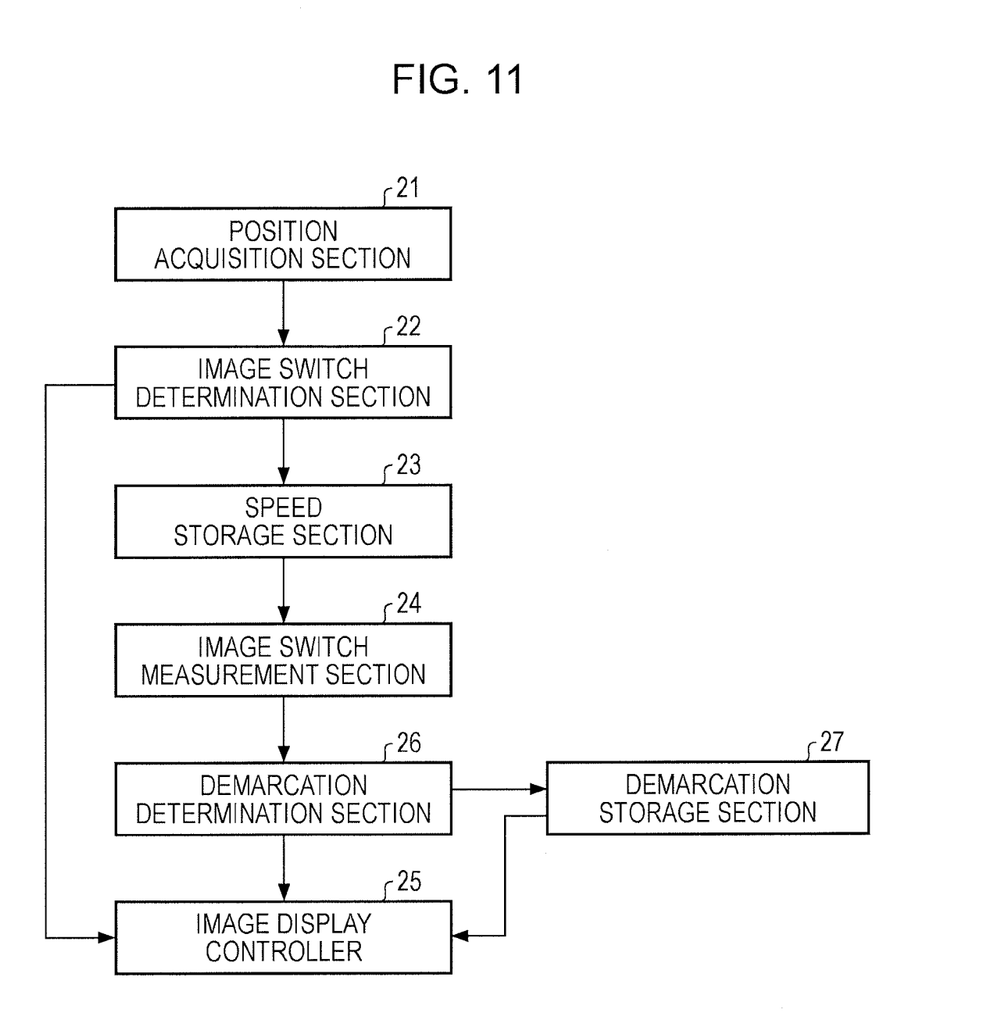
FIG. 11 shows a third functional configuration example of a controller according to an exemplary embodiment, showing an example of functional configuration for implementing a function illustrated in FIG. 10.

FIG. 11 shows a third functional configuration example of a controller according to an exemplary embodiment, showing a functional configuration example for implementing a function illustrated in FIG. 10.

As shown in FIG. 11, the controller according to the third exemplary embodiment includes a position acquisition section 21, an image switch determination section 22, a speed storage section 23, an image switch measurement section 24, an image display controller 25, a demarcation determination section 26, and a demarcation storage section 27.

The respective functions of the position acquisition section 21, the image switch determination section 22, the speed storage section 23, the image switch measurement section 24, the image display controller 25, the demarcation determination section 26, and the demarcation storage section 27 are the same as the functions of those in FIG. 6, and thus are not described here.

Figure 12:
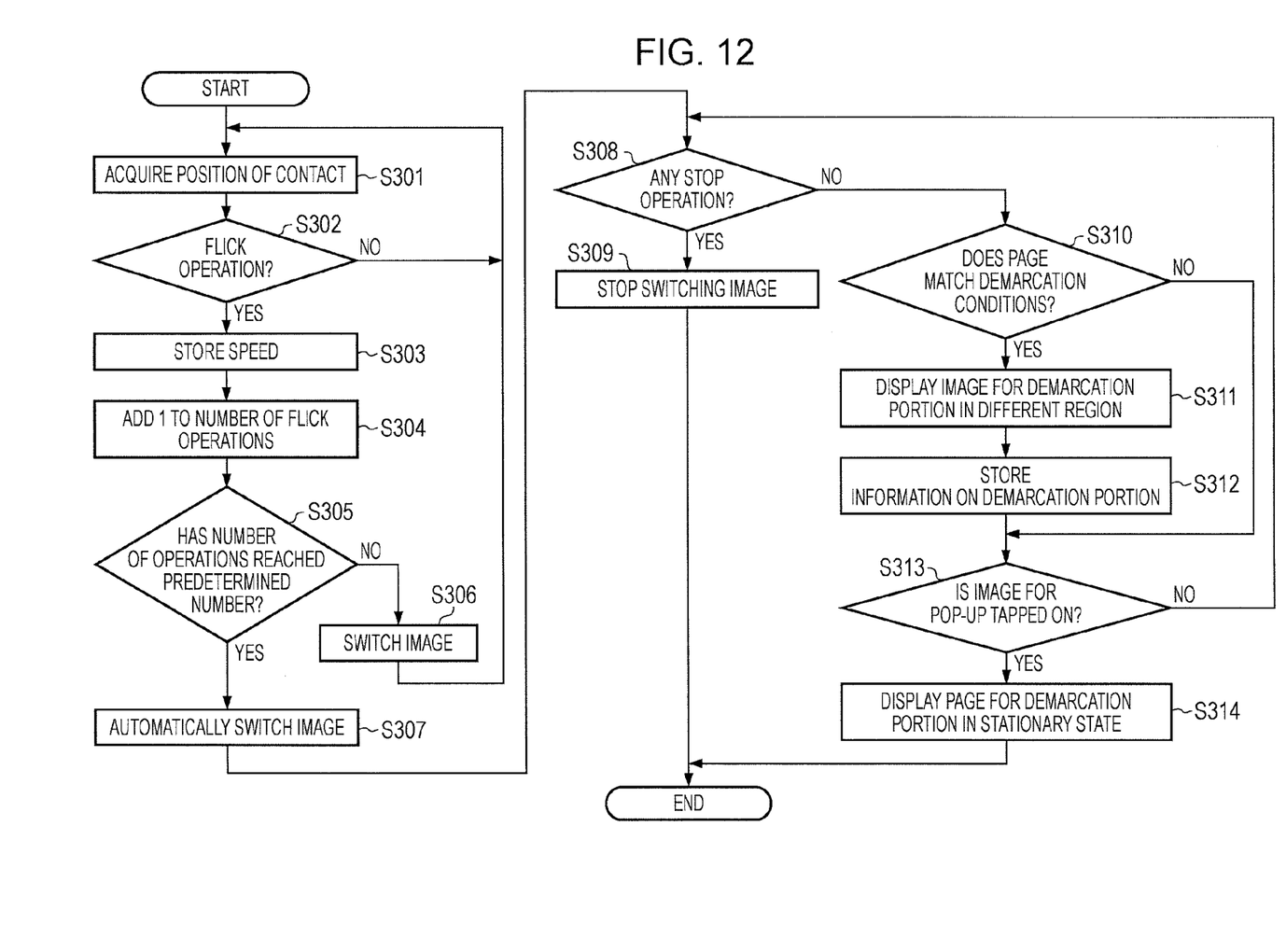
FIG. 12 is a flowchart illustrating operation of the controller shown in FIG. 11.

FIG. 12 is a flowchart illustrating operation of the controller shown in FIG. 11.

Operation of the controller according to the third exemplary embodiment will be described below with reference to FIGS. 11 and 12.

Step 301 to step 309 in FIG. 12 are the same as step 101 to step 109 in FIG. 4. Hence, subsequent operation of the controller will be described.

In the case where the image switch determination section 22 determines that a stop operation has not been performed (No in step 308), the demarcation determination section 26 determines whether or not a page displayed each time the image is switched matches predetermined demarcation conditions (step 310). When the page matches the demarcation conditions (Yes in step 310), images for the content corresponding to demarcation portions are displayed as a list in the region 141e that is different from a region in which images for the content are displayed (step 311). The demarcation storage section 27 stores information on the demarcation portion determined by the demarcation determination section 26 (step 312).

Next, it is determined whether or not any of the images for the content displayed in the region 141e has been tapped on (step 313). In the case where an image has been tapped on (Yes in step 313), the image display controller 25 has the page for the demarcation portion corresponding to the image displayed in a stationary state (step 314). In the case where any image displayed on the region 141e has not been tapped on (No in step 313), the process returns to step 308. In the case where the page does not match the predetermined demarcation conditions (No in step 310), the process returns to step 313.

Fourth Exemplary Embodiment

In the examples discussed in detail above, the image display device 10 such as a smartphone is described. However, the configurations discussed above may also be applied to other devices. For example, the configurations discussed above may be applied to an image forming device that forms an image on a recording medium and that outputs an image on a printing medium. The image forming device may be a device that provides only a printing function, or a device that additionally provides other image processing functions such as a scanner function, and a facsimile function.

Figure 13:
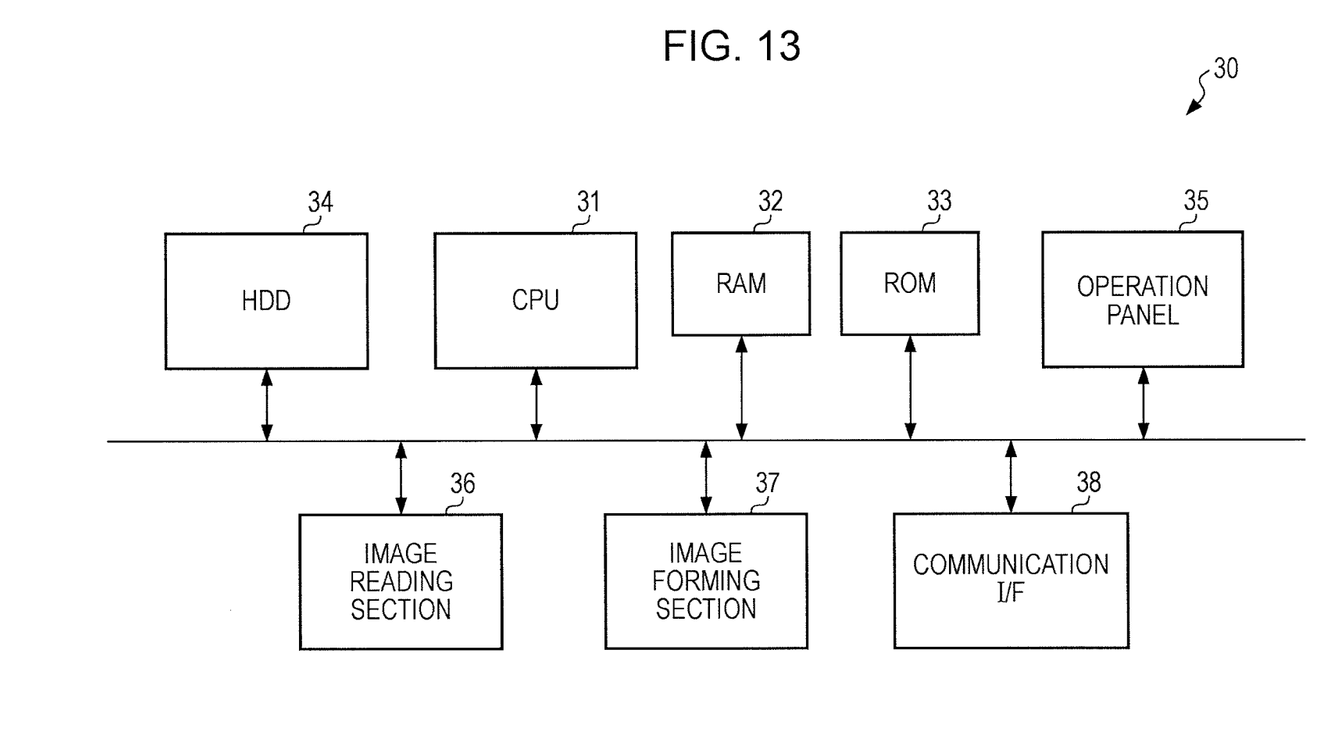
FIG. 13 shows an example of hardware configuration of an image forming device according to an exemplary embodiment.

FIG. 13 shows a hardware configuration example of an image forming device according to an exemplary embodiment.

As shown in FIG. 13, an image forming device 30 includes a CPU 31, a random access memory (RAM) 32, a read only memory (ROM) 33, a hard disk drive (HDD) 34, an operation panel 35, an image reading section 36, an image forming section 37, and a communication interface (hereinafter referred to as "communication I/F") 38.

The CPU 31 loads various types of programs stored in the ROM 33 or the like into the RAM 32 to execute the programs to achieve various functions to be discussed later.

The RAM 32 is a memory used as a working memory for the CPU 31, for example.

The ROM 33 is a memory that stores the various types of programs, etc. to be executed by the CPU 31.

The HDD 34 is a magnetic disk device, for example, that stores image data read by the image reading section 36, image data for use in image formation performed by the image forming section 37, etc.

The operation panel 35 is a touch panel, for example. In the exemplary embodiment, the operation panel 35 is provided as an example of an image display that displays information on the device.

The image reading section 36 reads an image recorded on a recording medium such as paper. The image reading section 36 may be a scanner, for example, and may be of a CCD type in which light radiated from a light source and reflected by an original copy is contracted using a lens to be received by charge coupled devices (CCD), or a CIS type in which light sequentially radiated from a light emitting diode (LED) light source and reflected by an original copy is received by a contact image sensor (CIS).

The image forming section 37 forms an image on a recording medium. The image forming section 37 may be a printer, for example, and may be of an electrophotographic system in which toner adhering to a photosensitive body is transferred onto a recording medium such as paper to form an image, or an inkjet type in which ink is ejected onto a recording medium to form an image. In the fourth exemplary embodiment, the image forming section 37 is provided as an example of an image forming unit that forms an image on a recording medium.

The communication I/F 38 exchanges various information with other devices via a network.

The CPU 11 and the memory 12 used as a controller in the image display device 10 correspond to the CPU 31, the RAM 32, the ROM 33, and the HDD 34 in the image forming device 30 according to the fourth exemplary embodiment. Hence, such components may be referred to as a controller in the image forming device 30 according to the fourth exemplary embodiment.

The configuration discussed above for the image display device 10 may be applied to an image displayed on the operation panel 35. For example, the operation panel 35 may display as a preview image a list of print jobs waiting to be printed by the image forming device 30 to allow the user to select one or more of the print jobs that he/she desires to print. In the case where the image forming device 30 has a facsimile function, further, the operation panel 35 may display a list of facsimile transmission destinations to allow the user to select one or more of the facsimile transmission destinations that he/she desires to transmit a document via facsimile.

The controller configured as illustrated in FIGS. 3, 6, and 11 may also be considered as an image control device. In this case, the controller in FIGS. 3, 6, and 11 may be considered as an image control device including a position acquisition section 21, an image switch determination section 22, a speed storage section 23, and an image display controller 25. The position acquisition section 21 acquires the position at which a predetermined contacting object contacts a liquid crystal panel 141. The liquid crystal panel 141 displays a part of content as an image in a predetermined region, and switches the image to display the part of the content in a predetermined order. The image switch determination section 22 determines whether or not to switch the image displayed on the liquid crystal panel 141 in accordance with variations in position acquired by the position acquisition section 21. The speed storage section 23 stores the speed at which the image is switched in the case where the image switch determination section 22 determines to switch the image. The image display controller 25 continuously switches subsequent images on the basis of the speed stored in the speed storage section 23 when the image is continuously switched a predetermined number of times or more.

Further, the process performed by the controller in FIGS. 3, 6, and 11 may be implemented through cooperation between software and hardware resources. For example, the process may be performed by the CPU 11 by loading a program that implements the functions of the controller illustrated in FIG. 3 into the memory 12 to execute the program.

Hence, the program may be considered as a program including: acquiring the position at which a predetermined contacting object contacts a liquid crystal panel 141 when the contacting object contacts the liquid crystal panel 141, the liquid crystal panel 141 being configured to display a part of content as an image in a predetermined region and to switch the image to display the part of the content in a predetermined order; determining whether or not to switch the image displayed on the liquid crystal panel 141 in accordance with variations in acquired position; storing the speed at which the image is switched in the case where it is determined to switch the image; and continuously switching subsequent images on the basis of the stored speed when the image is continuously switched a predetermined number of times or more.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image display device comprising:
a display configured to display different images that represent respective parts of information content;
an image switch determination section configured to determine whether or not to switch an image being displayed, in response to an object contacting the display;
a speed storage section configured to store a speed at which the image is switched in the case where the image switch determination section determines to switch the image; and
an image display controller configured to change an image switching mode from a manual switching mode to an automatic switching mode, in response to the image being switched a predetermined number of times or more,
wherein, in the manual switching mode, the image display controller controls the display to switch the image in response to the object contacting the display, and
wherein, in the automatic switching mode, the image display controller controls the display to automatically switch the image at the speed stored in the storage section to represent a subsequent part of the information content at the speed stored in the speed storage section,
wherein in response to i) a first image being manually switched at a first speed, ii) a second image being manually switched at a second speed different from the first speed, and iii) the image switching mode switching to the automatic switching mode, a third image is automatically switched at the first speed and a fourth image is automatically switched at the second speed.

2. An display device comprising:
a display configured to display images;
a controller configured to change an image switching mode from a manual switching mode to an automatic switching mode, in response to a displayed image being switched a predetermined number of times or more,
wherein in the manual switching mode, the controller controls the display to switch the image in response to an object contacting the display,
wherein in the automatic switching mode, the controller controls the display to automatically switch the image according to a stored switching speed,
wherein the stored switching speed is a speed at which an image was switched in the manual switching mode, and
wherein in response to i) a first image being manually switched at a first speed, ii) a second image being manually switched at a second speed different from the first speed, and iii) the image switching mode switching to the automatic switching mode, a third image is automatically switched at the first speed and a fourth image is automatically switched at the second speed.

* * * * *